United States Patent
Shehata et al.

(10) Patent No.: US 9,208,554 B2
(45) Date of Patent: Dec. 8, 2015

(54) APPARATUS FOR DETECTING HUMANS ON CONVEYOR BELTS USING ONE OR MORE IMAGING DEVICES

(75) Inventors: Mohamed Shehata, Calgary (CA); Tamer Mohamed, Calgary (CA); Wael Badawy, Calgary (CA)

(73) Assignee: Intelliview Technologies Inc., Calgary, Alberta (CA)

( * ) Notice: Subject to any disclaimer, the term of this patent is extended or adjusted under 35 U.S.C. 154(b) by 235 days.

(21) Appl. No.: 13/351,103

(22) Filed: Jan. 16, 2012

(65) Prior Publication Data

US 2013/0182890 A1    Jul. 18, 2013

(51) Int. Cl.
*G06K 9/20* (2006.01)
*G06T 7/00* (2006.01)

(52) U.S. Cl.
CPC .............. *G06T 7/0008* (2013.01); *G06K 9/209* (2013.01); *G06K 9/2018* (2013.01); *G06K 2209/09* (2013.01); *G06T 2207/10048* (2013.01); *G06T 2207/30112* (2013.01); *G06T 2207/30196* (2013.01)

(58) Field of Classification Search
CPC . G06K 9/2018; G06K 9/209; G06K 2209/09; G06T 7/0008; G06T 2207/10048; G06T 2207/30112; G06T 2207/30196
See application file for complete search history.

(56) References Cited

U.S. PATENT DOCUMENTS

| | | | |
|---|---|---|---|
| 5,181,254 A * | 1/1993 | Schweizer et al. | 382/100 |
| 6,453,057 B1 * | 9/2002 | Marshall et al. | 382/117 |
| 6,556,711 B2 * | 4/2003 | Koga et al. | 382/173 |
| 6,993,184 B2 * | 1/2006 | Matsugu | 382/173 |
| 7,046,761 B2 * | 5/2006 | Ellenbogen et al. | 378/57 |
| 7,382,895 B2 | 6/2008 | Bramblet et al. | |
| 7,639,840 B2 | 12/2009 | Hanna et al. | |
| 7,645,992 B2 * | 1/2010 | Lyubchik et al. | 250/342 |
| 7,961,906 B2 | 6/2011 | Ruedin | |
| 8,041,139 B2 * | 10/2011 | Ma | 382/254 |
| 8,081,238 B2 * | 12/2011 | Ono | 348/234 |
| 8,254,625 B2 * | 8/2012 | Coulter et al. | 382/103 |
| 8,611,586 B1 * | 12/2013 | Brodeur et al. | 382/100 |
| 2008/0144885 A1 * | 6/2008 | Zucherman et al. | 382/103 |
| 2009/0097730 A1 * | 4/2009 | Kasai et al. | 382/132 |

OTHER PUBLICATIONS

Fu et al., "An Extraction of Infrared Occluded-object Based on Maximum Variance and Negative Selection". 2008 International Workshop on Education Technology and Training & 2008 International Workshop on Geoscience and Remote Sensing, 686-690.*

(Continued)

*Primary Examiner* — Katrina Fujita
(74) *Attorney, Agent, or Firm* — Anthony R. Lambert

(57) ABSTRACT

A system for detecting a class of objects at a location, for example humans on a conveyor belt. A thermal camera may be used to detect objects and to detect the variance of the heat distribution of objects to classify them. Objects detected in an image from one camera may be detected in an image from another camera using geometric correction. A color camera may be used to detect the number of edges and the number of colors of an object to classify it. A color camera may be used with an upright human body classifier to detect humans in an area, and blobs corresponding to the detected humans may be tracked in a thermal or color camera image to detect if a human enters an adjacent forbidden area such as a conveyor belt.

15 Claims, 8 Drawing Sheets

(56) References Cited

OTHER PUBLICATIONS

Guo et al., "Rotation invariant texture classification using LBP variance (LBPV) with global matching", Pattern Recognition 43 (2010), 706-719.*

Lai et al., "Automatic shoe-pattern boundary extraction by image-processing techniques", Robotics and Computer-Integrated Manufacturing 24 (2008), 217-227.*

Hedvig Sidenbladh; Detecting Human Motion With Support Vector Machines; 17th IAPR International Conference on Pattern Recognition; vol. 2; pp. 188-191, Cambridge, UK, 2004.

Ju Han and Bir Bhanu: Detecting Moving Humans Using Color and Infrared Video; IEEE Conference on Multisensor Fusion and Integration for Intelligent Systems, pp. 228-233; Aug. 2003.

Navneet Dalal and Bill Triggs; Histograms of Oriented Gradients for Human Detection; , in Computer Vision and Pattern Recognition, IEEE Computer Society Conference on, Los Alamitos, CA, USA, 2005, vol. 1, pp. 886-893.

Oncel Tuzel, Fatih Porikli and Peter Meeri; Human Detection Via Classification on Riemannian Manifolds;Computer Vision and Pattern Recognition, 2007. CVPR '07. IEEE Conference on, pp. 1-8, Jun. 2007.

* cited by examiner

APPARATUS FOR DETECTING HUMANS ON CONVEYOR BELTS USING ONE OR MORE IMAGING DEVICES

TECHNICAL FIELD

Detection

BACKGROUND

North American airports are employing new methods for baggage check-in and shipping. A passenger is typically able to buy the ticket and check in online. With the boarding pass in hand, the only remaining step is to handle the passenger baggage. In the airports attempts to reduce queues and automate the whole process of passenger check-in, passengers are now responsible for taking the baggage to a conveyor belt. The consequence of this is that a part of the conveyor belt is accessible to the public which cases many issues including safety and security issues.

It would seem logical for each Airline to supervise this process directly because the luggage belt poses a safety risk for the passengers. In practice, however, Airline staff may be engaged in other tasks and do not directly monitor the luggage loading processes.

These public and unobserved luggage belt areas have introduced several safety and security concerns.

Safety:

There are three main kinds of accidents that could lead to harm: injuries caused by the conveyor belt itself, caused by the conveyor belts steep decline behind the public area and health risks caused by the industrial X-ray scanner.

There are two main reasons why people get onto the conveyor belt. Firstly passengers are requested to lift and load items that may weigh 20 kg or more onto various configurations of moving luggage belts. Some people become unbalanced and fall on the belt. For example, an elderly person tripped onto the belt while attempting to put the baggage on the belt. Secondly there have been cases of passengers deliberately climbing onto the luggage belt. For example, there have been incidents where children took joyrides on the luggage belt.

Security:

It has to be guaranteed that no unauthorized person can enter the security sterile baggage handling area with the conveyor belt. This could interrupt and delay the baggage loading process at the airport. There are several other security ramifications arising like theft, vandalism and terrorism.

Main challenges and problem cases:

The algorithm has to have a very low false positive rate. One to two bags of the 600000 bags transported daily are allowed to be registered as false alarms.

Crouched humans sitting still on the conveyor belt and thus expressing no motion.

Occlusion of body parts.

Variety of expected postures due to the camera position: standing people, people laying on the conveyor belt in different orientations, crouched humans.

"Hot bags" emitting heat similar to humans.

Unusual movement like falling, still (but moving with the conveyor belt), running, walking.

Visual noise: moving shadows, light reflections, arms adjusting the baggage which should not trigger the alarm.

Variety of different movement speed: running in the same direction as the conveyor belt produces very fast motion and walking in the opposite direction produces a very slow motion.

Authors who have worked on the problem of detecting humans in video, include: Thome N., Ambellouis S., Bodor R., Jackson B., Papanikolopoulos N., Bertozzi M., Broggi A., Fascioli A., Graf T., Meinecke M-M., Zhou J., Hoang J, Wren C R, Azarbayejani A, Darrell T, Pentland A P, Gutta S., Brodsky T., Steffens J B, Elagin E V, Nocera L P A, Maurer T, Neven H, Chen H-P, Ozturk O, Yamasaki T, Aizawa K, Zin T T, Takahashi H, Hama H, Gilmore III E T, Frazier P D, Chouikha M F, Dalal N, Triggs B, Schmid C, Viola P, Jones M, Miezianko R, Pokrajac D, Grisleri P, Cutler R, Davis L S, Sidenbladh H, Toth D, Aach T, Lee D-Jye, Zhan P, Thomas A, Schoenberger R, Snow D, Zhu Q, Yeh M-C, Cheng K-T, Avidan S, Suard F, Rakotomamonjy A, Bensrhair A, Del Rose M, Felisa M, Yao J, Odobez J M, Tuzel O, Porikli F, Meer P, Fujimura K, Xu F, Kim H G, Ahn S C, Kim N H, Echigo T, Maeda J, Nakano H, Schwartz W R, Kembhavi A, Harwood D, Fang Y, Yamada K, Ninomiya Y, Horn BKP, Masaki I, Yun T-J, Guo Y-C, Chao G.

However there remains a need for a system capable of distinguishing humans from other blobs in a video.

SUMMARY

A method and system is provided for responding to the presence in a scene of a member of a specified class of objects, the method comprising acquiring an image of the scene using a sensor, identifying in a computer system one or more objects in the image, each object having a radiation intensity distribution, determining a variance of the radiation intensity distribution for each object, and classifying each object according to the variance of the radiation intensity distribution determined for the respective object, and for each object, taking an action if the respective object is classified as one of the specified class of objects.

In various embodiments, there may be included any one or more of the following features: The sensor may be a thermal imaging device, the image may be a thermal image and the radiation intensity distribution may be a heat intensity distribution. Stationary heat sources may be subtracted from the thermal image before identifying objects in the thermal image. A color image of the scene may further be acquired using a color imaging device, and in the computer system, the one or more objects identified by the computer system in the thermal image may be identified in the color image, a color histogram of each object may be analyzed, and each object classified according to a quantization of colors determined from the color histogram of the respective object. The specified class of objects may be humans. Each object may be classified as human if the variance of the image intensity distribution for the respective object falls within a predetermined range intermediate between a range of variances of image intensity typical for metal objects and a range of variances of image intensity typical for fabric or plastic objects. The scene may be a view of a conveyor belt. The action may comprise stopping the conveyor belt. The action may comprise alerting operating personnel. An edge filter may be applied to each object and each object classified according to a number of edge-like features of the object detected by the edge filter.

A method is provided for responding to the entry of a member of a specified class of objects into an area, the method comprising acquiring a first sequence of images of a scene with a first imaging device oriented in a manner suitable for detecting members of the specified class of objects, acquiring a second sequence images of the scene with a second imaging device oriented in a manner suitable to detect whether blobs detected in the second sequence of images are within the area, detecting in a computer system members of the specified class of objects in the first sequence of images, for each member of the specified class of objects detected in the first sequence of images detecting in the computer system a corresponding blob in the second sequence of images, and detecting in the computer system, for each blob corresponding to a member of the specified class of objects, when the respective blob enters the area, and taking an action when a blob corresponding to a member of the specified class of objects is detected to enter the area.

In various embodiments, there may be included any one or more of the following features: The specified class of objects may be humans. The humans may be detected based on an upright human body classifier. The upright human body classifier may be based on a histogram of oriented gradients. The upright human body classifier may be based on optical flow patterns. The upright human body classifier may be based on covariance features. The first imaging device may be a color camera and the first sequence of images may be a sequence of color images. The second imaging device may be a thermal camera and the second sequence of images may be a sequence of thermal images. The second imaging device may be a color camera and the second sequence of images may be a sequence of color images. Each blob may be tracked using a Kalman filter. The area may be an area above a conveyor belt. The conveyor belt may be a baggage handling conveyor belt. The action may comprise stopping the conveyor belt. The action may comprise alerting operating personnel.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

A system for detecting a class of objects at a location, for example humans on a conveyor belt.

Any combination of the following systems can be used to increase the detection rate and reduce the error rate further by combining information from the systems, for example using majority rating.

Physical Layer

Figure 1:
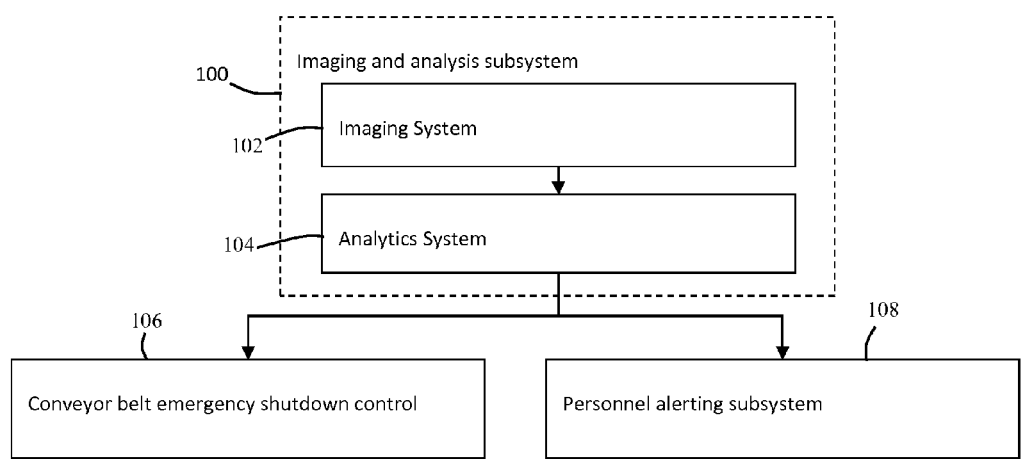
FIG. 1 is a block diagram showing the physical layer of an embodiment of an image analysis system.

FIG. 1 is a block diagram showing the physical layer of an embodiment of an image analysis system. An imaging and analysis subsystem 100 comprises an imaging system 102, in this case consisting of one thermal camera 112, and computer configured software setup 104 which is responsible for the detection of humans. The result from the software setup is passed to actuator system 106. The actuator system 106, which is responsive to the computer system 104, stops the conveyor belt if a human is detected. The computer system may also trigger alarm system 108 which informs the operating personnel about the incident. The imaging system, computer system and actuator may use any conventional communication channels for communications passed between them. The computer system may provide control signals to the imaging system and to the actuator.

Description of Analytic System Number 1: Single Thermal Camera Based System.

Figure 2:
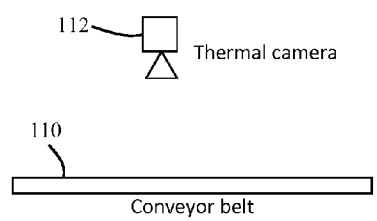
FIG. 2 is an illustration of an embodiment of the analytic system using a single thermal camera.

FIG. 2 is an illustration of an embodiment of the analytic system using a single thermal camera. Thermal camera 112 views the area above conveyor belt 110, in this case from above, in order to detect humans on the conveyor belt.

Analytics System

Figure 3:
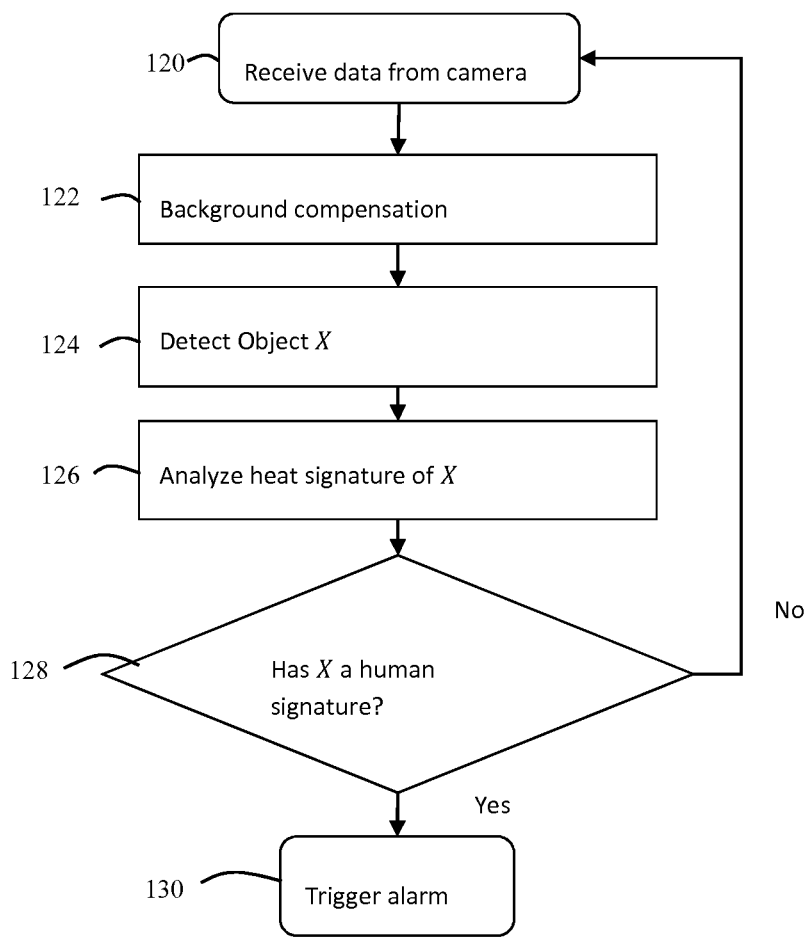
FIG. 3 is a block diagram showing the steps of the analytics system using a single thermal camera.

FIG. 3 is a block diagram showing the steps of the analytics system using a single thermal camera. In step 120 the analytics system 104 receives data from the single thermal camera 112. In step 122 the software setup 104 conducts background compensation, in this case by subtracting stationary heat sources, such as light sources and conveyor belt rollers, and the semi stationary heat source, which is the conveyor belt itself. In step 124 the software setup obtains object meshes from the thermal image to detect an object. In step 126 the heat signature is analyzed, to make a classification in step 128 whether it is a human signature. If a human is detected the alarm will be triggered in step 130.

Background Compensation

The first stage image analysis system subtracts the stationary heat sources, which are the light sources and the conveyor belt rollers, and the semi stationary heat source, which is the conveyor belt itself.

Detect Object X

The second stage image analysis system detects the presence of a foreground hot object in the area of the conveyor belt itself. The system may use the technique for object detection and tracking described in the U.S. Pat. No. 7,616,782, B2.

The result of the algorithm is a mesh of anchor points which describes the detected object.

Analyze Heat Signature of X

The third stage of the detection system rejects hot objects that are not human to prevent false alarms and passes the result to the actuator, which sounds an alarm and activates an emergency shutdown of the conveyor belt.

Figure 4:
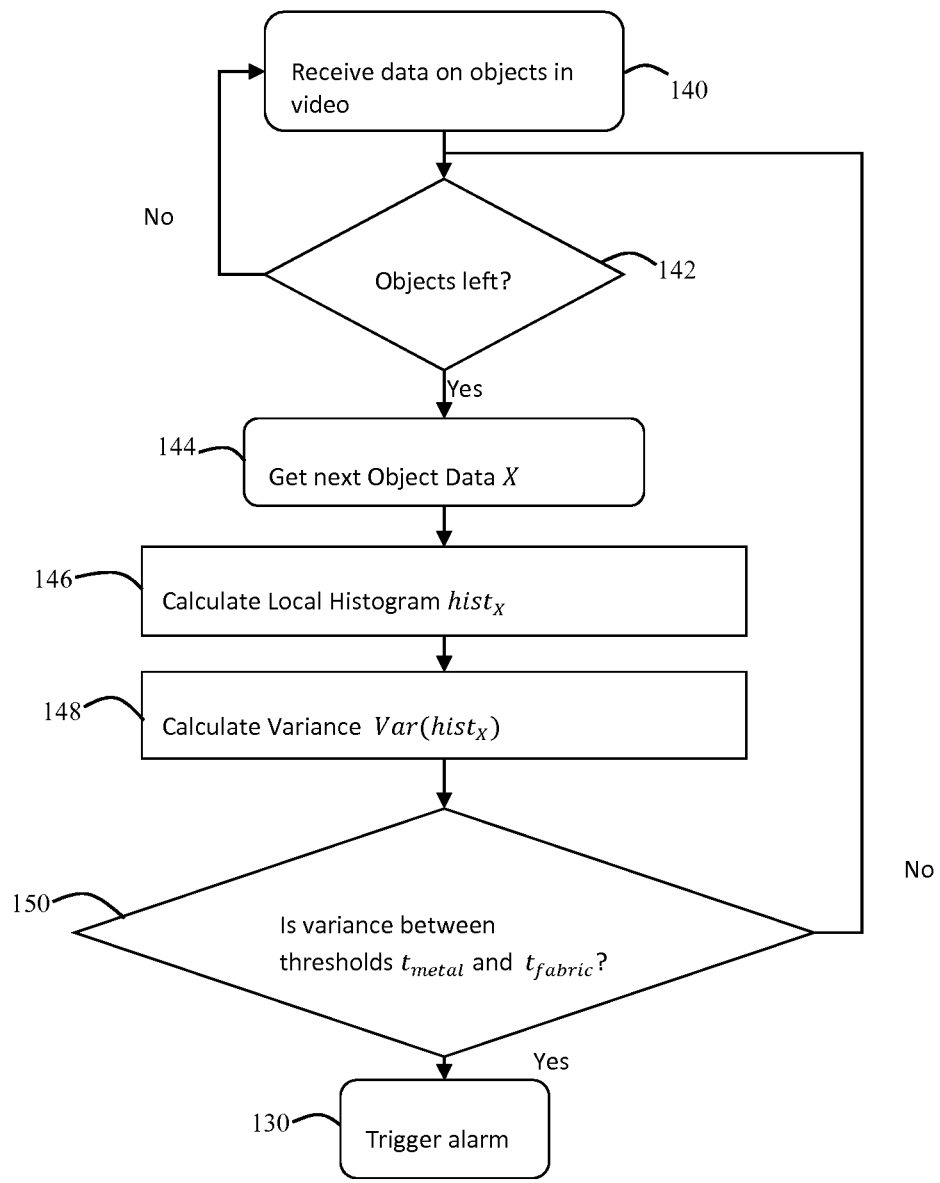
FIG. 4 is a block diagram showing the steps of the heat signature analysis stage of the analytics system.

FIG. 4 is a block diagram showing the steps of the heat signature analysis stage of the analytics system. In step 140 data is received on what objects have been detected in step 124. In step 142 it is determined if all detected objects have undergone heat signature analysis. If so, the heat signature analysis stage waits to receive more object detection data. If not, the heat signature analysis stage proceeds in step 144 to receive image data about a detected object. In step 146 the heat signature analysis stage calculates a local histogram of thermal brightness from the image data about the object. In step 148 the variance of the histogram is calculated. In step 150 it is determined if the variance is between preset thresholds. If the variance is between the preset thresholds an alarm is triggered in step 130, otherwise the system proceeds to analyze the next object.

Calculate Local Histogram $hist_X$

The system calculates the histogram of the heat intensity distribution ($hist_{Object}$) of the object X. The histogram describes the probabilities $p_i = hist_X(i)$, $i = 0 \ldots 255$ of every brightness value $x \in X$.

$$hist_X(i) = \frac{\|\{x \mid x = i, x \in X\}\|}{\|X\|}$$

Calculate Variance $Var(hist_X)$

The variance is a measure for the distribution of values compared to the mean. The system calculates the variance of the local histogram which can be written in this way:

$$Var(hist_{Object}) = \sum_{i=0}^{255} hist_{Object}(i) * (i - \mu)^2$$

The mean is defined as follows:

$$\mu = \sum_{i=0}^{255} hist_{Object}(i) * i$$

Is Variance Between Thresholds $t_{metal}$ and $t_{fabric}$?

Different classes of objects have characteristic heat distributions. Objects made out of metal (as in metal case baggage) have very sharp heat intensity histograms that exhibits almost zero variance. Objects made of leather/cloth/plastic exhibit very large variance heat distributions. Thermal images of humans are characterized by narrow heat distributions centered about 35.5 degrees Celsius.

If the variance of the object is smaller than the variance of objects made out of fabric/plastic/cloth and is greater than the variance for objects made out of metal then the objects is classified as a human.

$t_{metal} < Var(hist_{Object}) < t_{fabric}$

The thresholds can be adjusted by the following rules:

The system is supplied by the latitude and longitude of the airport location and this way it can calculate sun rise and sun set times. Based on this information, the system increases the bias towards identifying hot objects as humans when the time of the detection is in the time range of sunset time plus one hour and sunrise time plus one hour. Outside this time range, the bias is increased towards detecting false positives. The system also rejects more hot-object occurrences during the months of the summer.

The system can be manually configured to run only during night hours when traffic is slow and the incident is more likely to happen. This further reduces the chance for false alarms without sacrificing the sensitivity of the system and risking false negatives.

Description of System Number 2a: Thermal Camera Plus a Color Camera

Figure 5:
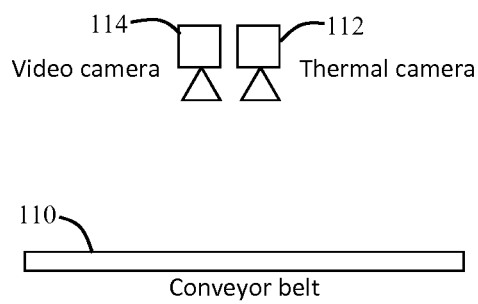
FIG. 5 illustrates an embodiment of the invention using one thermal camera and a color video camera.

FIG. 5 illustrates an embodiment of the invention using one thermal camera 112 and a color video camera 114. In this embodiment, both the video camera and thermal camera look at the conveyor belt from above.

Analytics System

Figure 6:
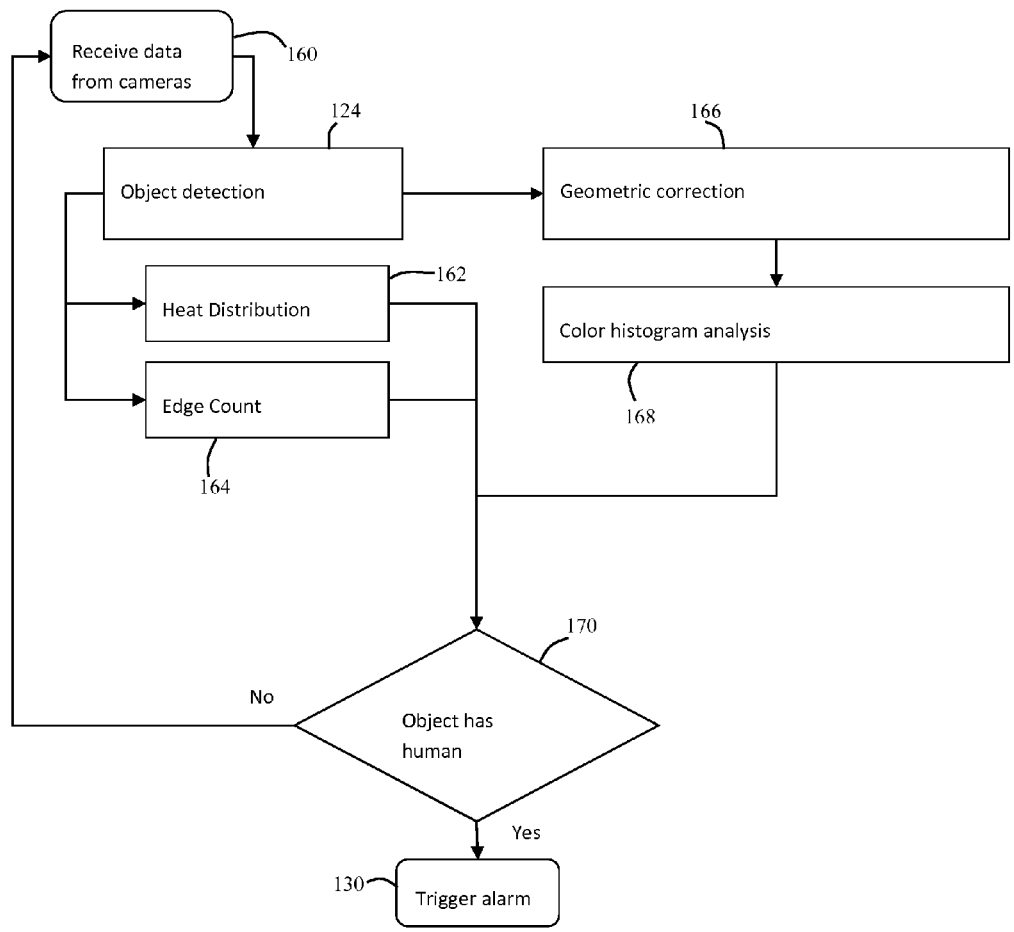
FIG. 6 is a block diagram showing the steps of the analytics system when using both a thermal camera and a video camera.

FIG. 6 is a block diagram showing the steps of an embodiment of the analytics system using both a thermal camera and a video camera. In step 160 image data is received from the cameras. Background compensation may be performed on the thermal data as in FIG. 3 but this is not shown in FIG. 6. In step 124 objects are detected in the thermal data. In step 162 the heat distributions of detected objects are analyzed. The same technique may be used as in step 126 in FIG. 3 shown in more detail in FIG. 4. In step 164 the number of edge like features in the thermal data is detected. In step 166 geometric correction is performed on the objects detected in the thermal data to identify those objects in the color image data. In step 168 the color distribution of objects identified in the color image data is analyzed. In step 170 the information from steps 162, 164 and 168 are combined to make a determination whether a detected object is human. If the object is determined to be human, in step 130 the alarm is triggered.

Object Detection

The image stream from the infrared camera is used to detect moving hot objects.

The image analysis system detects the presence of a foreground hot object in the area of the conveyor belt itself. A technique for object detection and tracking is described in U.S. Pat. No. 7,616,782, B2.

The result of the algorithm is a mesh which describes the detected object.

Geometric Correction

The detected objects are meshes which consist of several anchor points. The position of every anchor point is geometrically transformed to find the corresponding point in the color image. This transformation can be represented as a linear Transformation in 3D space. A homography H is a matrix that translates points from one camera plane to another plane. The matrix is computed based on 4 reference points which have to be entered manually. d is the distance between the two cameras. $x_i$ is a point of the color camera and $x_i'$ is a point in the corresponding point in respect to the color cameras viewpoint.

$x_i' = Hx_i + d$

This transformation is done to find the area in the view point of the color camera which corresponds to the detection area in the thermal image.

Heat Distribution

See Analyze heat signature of X.

Edge Count

An edge filter is applied to the object and the amount of edge-like features is counted. The amount has to be smaller than a threshold $t_{edge}$, because baggage pieces are more likely to have edge-like features.

Typical edge filters or corner filters are, for example, Sobel operator, Laplace operator or SUSAN.

Color Histogram Analysis

In most cases, baggage pieces don't have more than three colors. Humans can be more colourful because they have a lot of the different styles of clothing and wear different parts of cloth pieces (e.g. clothing for the upper body and lower body). Skin and hair color is also different from human to human.

The more different colors an object has, the more likely it is to be a human.

The frequency of the quantized colors is measured and has to exceed a threshold $t_{color}$.

Object has Human Signature?

The final decision whether an object is a human or not is based on all three parameters: heat distribution, edge count and color distribution.

The three different parameters can be weighted separately.

The system can be manually configured to run only during night hours when traffic is slow and the incident is more likely to happen. This further reduces the chance for false alarms without sacrificing the sensitivity of the system and risking false negatives.

Description of the System Number 2b: Thermal Camera Plus a Color Camera

Figure 7:
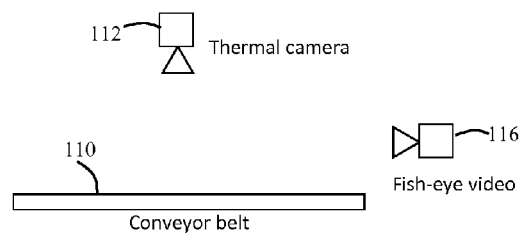
FIG. 7 is an illustration of an embodiment of the analytics system using a thermal camera and a fish-eye video camera.

FIG. 7 is an illustration of an embodiment of the analytics system using a thermal camera 112 and a fish-eye video camera 116. In this embodiment the thermal camera looks at the conveyor belt 110 from above with a field of view extending into a neighbouring area from which humans may interact with the conveyor belt. Fish-eye video camera 116 has a field of view which also extends from the belt area into the neighbouring area.

Figure 8:
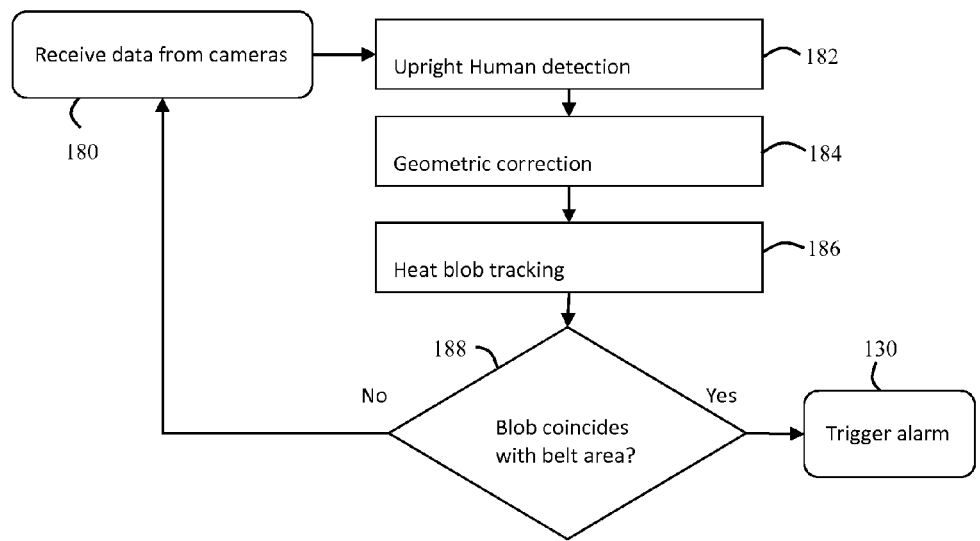
FIG. 8 is a block diagram showing the steps of the analytics system when using both a thermal camera and a fish-eye video camera.

FIG. 8 is a block diagram showing the steps of the analytics system in an embodiment using both a thermal camera and a fish-eye video camera. In step 180 the system receives data from the cameras. In step 182 the system detects upright humans in the data from the fish-eye video camera. In step 184 the system applies geometric correction to the detected upright humans to detect heat blobs corresponding to the upright humans in the data from the thermal camera. In step 186 the system tracks the heat blobs detected as corresponding to upright humans, for example using a Kalman filter. In step 188 the system detects if a blob detected as corresponding to an upright human coincides with the belt area. If so, in step 130 the system triggers the alarm. If not, the system continues to perform steps 180 to 186.

Upright Human Detection

The first stage in the detection is to analyze the image of the color camera and detect silhouettes of human beings based on a multi scale upright human body classifier.

The classification of an upright human can be based on, for example, Histogram of Oriented Gradients (N. Dalal and B. Triggs), Optical Flow Patterns (H. Sidenbladh) or covariance features (O. Tuzel, F. Porikli, and P. Meer) for example.

Geometric Correction

The output of the classifier is geometrically corrected to find the corresponding heat blob in the heat intensity image of the thermal camera.

This is the same method as described in Geometric correction in relation to FIG. 6 but this time the origin is the color image and the target is the thermal image.

Heat Blob Tracking

The heat blob identified as human is marked and tracked by means of a Kalman filter in the view of the thermal camera. The system activates the alarm if the marked blob track starts to coincide with the belt area.

Description of the System Number 3: Two Color Cameras

Figure 9:
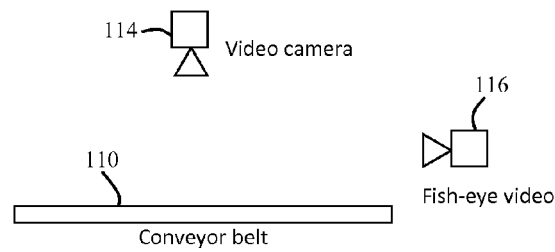
FIG. 9 is an illustration of an embodiment of the analytics system using a video camera and a fish-eye video camera.

FIG. 9 is an illustration of an embodiment of the analytics system using a video camera and a fish-eye video camera. The analysis for this setup may be the same as for the analysis shown in FIG. 8 for the thermal camera and fish eye camera setup shown in FIG. 7, except that the blobs tracked in step 186 are not heat blobs.

Upright Human Detection

See FIG. 7 is an illustration of an embodiment of the analytics system using a thermal camera 112 and a fish-eye video camera 116. In this embodiment the thermal camera looks at the conveyor belt 110 from above with a field of view extending into a neighbouring area from which humans may interact with the conveyor belt. Fish-eye video camera 116 has a field of view which also extends from the belt area into the neighbouring area.

FIG. 8 is a block diagram showing the steps of the analytics system in an embodiment using both a thermal camera and a fish-eye video camera. In step 180 the system receives data from the cameras. In step 182 the system detects upright humans in the data from the fish-eye video camera. In step 184 the system applies geometric correction to the detected upright humans to detect heat blobs corresponding to the upright humans in the data from the thermal camera. In step 186 the system tracks the heat blobs detected as corresponding to upright humans, for example using a Kalman filter. In step 188 the system detects if a blob detected as corresponding to an upright human coincides with the belt area. If so, in step 130 the system triggers the alarm. If not, the system continues to perform steps 180 to 186.

Upright Human detection as described in relation to FIG. 8.

Geometric Correction

The analysis system corrects for viewpoint and geometry and identifies the same human objects in the scene of the second color camera. This transformation can be represented as a linear Transformation in 3D space (J. Han and B. Bhanu). A homography H is a matrix that translates points from one camera plane to another plane. It is precomputed based on 4 reference points. d is the distance between the two cameras.

$$x_i' = Hx_i + d$$

Blob Tracking

The positions of the upright humans are tracked in the view of the second color camera.

See Heat blob tracking as described in relation to FIG. 8.

Blob Coincides with Conveyor Belt?

The system activates the alarm if the marked blob track starts to coincide with the belt area. The area of the conveyor belt is defined by a bounding box. As soon as the heat blob enters the bounding box the alarm will be triggered.

Combination of the Described Systems

Figure 10:
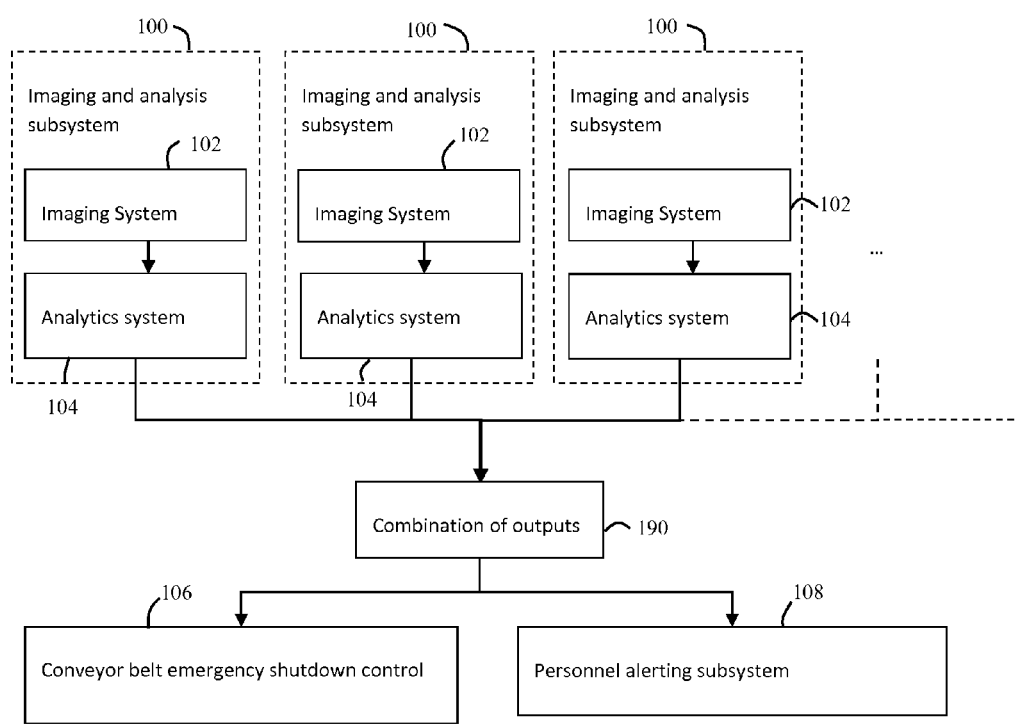
FIG. 10 is a block diagram showing the steps of the analytics system when several of the described systems are combined using a weighted majority system.

FIG. 10 is a block diagram showing the steps of an embodiment of the system in which several of the described imaging and analytic systems are combined. There are multiple imaging and analysis subsystems 100 each with an imaging system 102 and analytics system 104 (a computer configured with software for carrying out the disclosed methods). The outputs of the imaging and analysis subsystems are combined in step 190, for example using majority voting, to produce an overall decision. If the overall decision is that there is a human on the conveyor belt, actuator system 106 stops the conveyor belt, and alarm system 108 informs the operating personnel about the incident.

Majority Voting

The decision of every imaging and analysis subsystem can be combined to increase the detection rate and reduce the error rate.

$A_n = \{1, 0\}$ Decision of subsystem n

Voting Decision

Trigger alarm if a certain amount of subsystems detect humans: $\sum_{i=0}^{n} A_i > t_{alarm}$ Simple Majority
Trigger alarm if the majority of subsystems detect humans:

$$\sum_{i=0}^{n} A_i > \frac{n}{2}$$

Weighted Majority

Trigger alarm if a certain threshold $t_{alarm}$ of positive detections is reached but each subsystem has a different weight $w_n$ which relates informative value (e.g. a thermal camera could have more weight than a normal camera because it is more suited to detect humans): $\sum_{i=0}^{n} A_i * w_n > t_{alarm}$ More techniques of combining the output of systems than majority voting may be used. For example, instead of each imaging and analysis subsystem producing a binary human on belt/no human on belt decision, each subsystem may produce a likelihood of a human on belt given the observed data, which may include factors such as time of day or outside air temperature, and the likelihoods produced by the subsystems may be combined to produce an overall likelihood (or combined along with a prior to produce an overall probability) which may be compared to a threshold to produce a human on belt/no human on belt binary decision. The combination of the likelihoods may assume independence or take into account the non-independence of the systems. In a further embodiment, each subsystem produces a likelihood for each of a number of locations and the likelihoods produced at each location are combined to produce an overall decision as to whether there is a human at that location. In a still further embodiment, blobs detected by each subsystem are correlated and each subsystem produces a likelihood for each blob, and the likelihoods produced for each blob are combined to produce an overall decision as to whether the blob is human and on the belt.

Image Fusion

Figure 11:
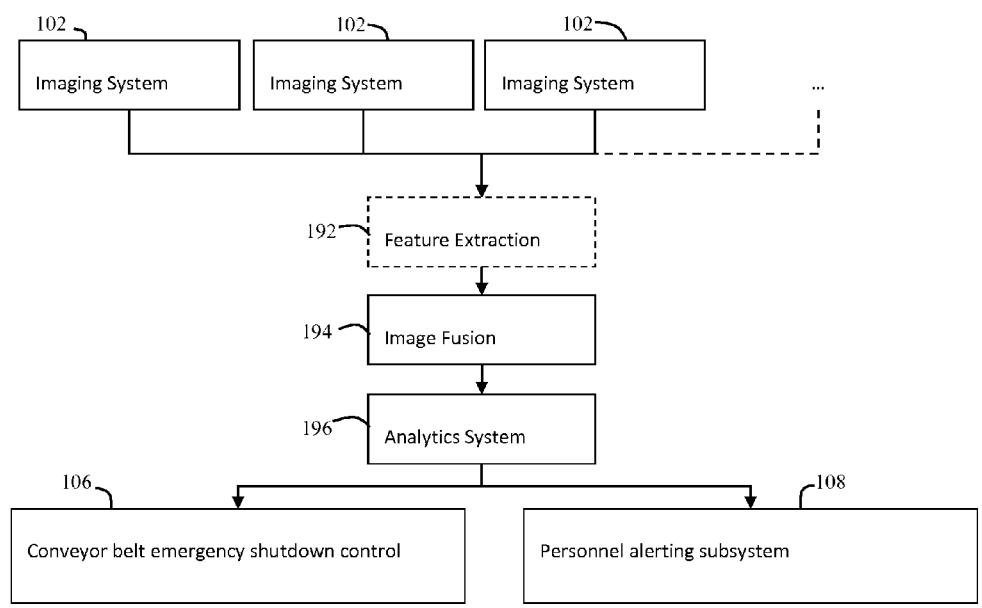
FIG. 11 shows a block diagram of the steps of the analytics system using image fusion.

FIG. 11 shows a block diagram of the steps of the analytics system using image fusion. Images are received from multiple cameras or imaging systems 102. Optionally, feature detection is then performed on the received images in step 192. In step 194 the information of the images from the different sources is combined. In step 196 an analytics system processes the combined images, to produce a determination as to whether there is a human on the conveyor belt. If there is, actuator system 106 stops the conveyor belt, and alarm system 108 informs the operating personnel about the incident.

Image Fusion

The process of image fusion combines the information of multiple image sources before the image is analysed. This can result in better performance. Images can also be fused after the process of feature detection such as edge detection.

While the embodiments shown detect humans on a conveyor belt, the techniques used may detect other objects on a conveyor belt, humans in places other than on a conveyor belt, or other objects in other locations. The computer used for the analysis system may be any computing device now known or later developed that is configured to carry out the processes described here. The computing devices may for example be personal computers programmed to carry out the described processes, or may be application specific devices that are hard wired to carry out the described processes. Communications between the various apparatus may use any suitable communication links such as wires or wireless that supply a sufficient data rate. The required communication links and general purpose computing devices required for implementing the method steps described here after suitable programming are already known and do not need to be described further.

Immaterial modifications may be made to the embodiments described here without departing from what is covered by the claims. In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. A method of responding to the presence in a scene of a member of a specified class of objects, the specified class of objects being one of plural classes of objects, comprising:
   acquiring an image of the scene using a sensor;
   in a computer system, identifying one or more objects in the image, each object having a radiation intensity distribution, determining for each object a variance value representing a variance of a histogram of the radiation intensity distribution of the respective object, and classifying each object as a member of one of the plural classes of objects according to a comparison of the variance value determined for the respective object to one or more thresholds; and
   for each object, taking an action upon the respective object being classified as a member of the specified class of objects.

2. The method of claim 1 in which the sensor is a thermal imaging device, the image is a thermal image and the radiation intensity distribution is a heat intensity distribution.

3. The method of claim 2 in which the specified class of objects is humans.

4. The method of claim 2 in which the scene is a view of a conveyor belt.

5. The method of claim 4 in which the action comprises stopping the conveyor belt.

6. The method of claim 2 in which the action comprises alerting operating personnel.

7. The method of claim 2 in which stationary heat sources are subtracted from the thermal image before identifying objects in the thermal image.

8. The method of claim 1 further comprising adjusting a threshold of the one or more thresholds based on the time of day.

9. The method of claim 1 further comprising adjusting a threshold of the one or more thresholds based on the time of year.

10. A method of responding to the presence in a scene of a member of a specified class of objects, the specified class of objects being one of plural classes of objects, comprising:
    acquiring an image of the scene using a sensor;
    in a computer system, identifying one or more objects in the image, each object having a radiation intensity distribution, determining for each object a variance value representing a variance of a histogram of the radiation intensity distribution of the respective object, and classifying each object as a member of one of the plural classes of objects according to the variance value determined for the respective object, wherein each object is classified as human if the variance value for the respective object falls within a predetermined range intermediate between a range of variances of image intensity typical for metal objects and a range of variances of image intensity typical for fabric or plastic objects; and for each object, taking an action upon the respective object being classified as a member of the specified class of objects.

11. A system for responding to the presence in a scene of a member of a specified class of objects, the specified class of objects being one of plural classes of objects, comprising:
   a sensor for detecting an image of the scene; and
   a computer system for analyzing the image, the computer system being configured to identify one or more objects in the image, each object having a radiation intensity distribution, determine for each object a variance value representing a variance of a histogram of the radiation intensity distribution of the respective object, and classify each object as a member of one of the plural classes of objects according to a comparison of the variance value determined for the respective object to one or more thresholds.

12. The system of claim 11 further comprising an actuation system responsive to the computer system for taking an action if the respective object is classified as one of the specified class of objects.

13. The system of claim 12 in which the sensor is a thermal imaging device, the image is a thermal image and the radiation intensity distribution is a heat intensity distribution.

14. The system of claim 13 in which the scene is a view of a conveyor belt.

15. The system of claim 14 in which the action comprises stopping the conveyor belt.

* * * * *